(12) United States Patent
Lopes et al.

(10) Patent No.: US 9,828,220 B2
(45) Date of Patent: Nov. 28, 2017

(54) SYSTEMS AND METHODS FOR DETECTING RESCUE HOIST LOADS

(71) Applicant: Goodrich Corporation, Charlotte, NC (US)

(72) Inventors: David R. Lopes, Fullerton, CA (US); Theodore W. Wong, Walnut, CA (US); Domenic DeZan, Upland, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/069,646

(22) Filed: Mar. 14, 2016

(65) Prior Publication Data

US 2017/0260030 A1   Sep. 14, 2017

(51) Int. Cl.
| | |
|---|---|
| *G01L 1/26* | (2006.01) |
| *B66C 23/90* | (2006.01) |
| *B66C 23/02* | (2006.01) |
| *G01L 5/00* | (2006.01) |

(52) U.S. Cl.
CPC ............ *B66C 23/90* (2013.01); *B66C 23/022* (2013.01); *G01L 5/0042* (2013.01); *G01L 5/0071* (2013.01)

(58) Field of Classification Search
CPC ..... B66C 23/90; B66C 23/022; G01L 5/0042; G01L 5/0071
USPC ................................................... 73/862.393
See application file for complete search history.

(56) References Cited

U.S. PATENT DOCUMENTS

| | | | |
|---|---|---|---|
| 3,809,334 A | 5/1974 | Beurer et al. | |
| 4,044,610 A * | 8/1977 | Oldaeus | E02F 3/30 172/430 |
| 4,178,591 A * | 12/1979 | Geppert | B66C 23/905 212/278 |
| 4,660,729 A | 4/1987 | Carbert | |
| 5,209,568 A * | 5/1993 | Buffard | G01N 3/18 374/45 |
| 5,557,526 A * | 9/1996 | Anderson | B66C 23/905 212/238 |
| 6,044,991 A | 4/2000 | Freudenthal et al. | |
| 6,098,322 A * | 8/2000 | Tozawa | E02F 3/437 37/414 |
| 6,144,307 A * | 11/2000 | Elliot | B66D 1/58 340/665 |
| 6,202,013 B1 * | 3/2001 | Anderson | B66C 13/40 212/276 |
| 6,508,372 B1 * | 1/2003 | Lamphen | B66C 23/36 212/196 |
| 6,708,926 B2 | 3/2004 | Bonisch | |
| 2011/0115305 A1 * | 5/2011 | Chan | H02M 1/12 307/115 |
| 2014/0244101 A1 * | 8/2014 | Chitty | E02F 9/2054 701/31.6 |
| 2016/0009393 A1 | 1/2016 | Repp et al. | |

FOREIGN PATENT DOCUMENTS

EP    2202194    5/2012

* cited by examiner

*Primary Examiner* — Max Noori
(74) *Attorney, Agent, or Firm* — Snell & Wilmer L.L.P.

(57) ABSTRACT

A boom assembly for a hoist may include a flat surface configured to elastically deform in response to a load on the hoist, and a strain sensor coupled to the flat surface and configured to generate an electronic signal.

8 Claims, 7 Drawing Sheets

SYSTEMS AND METHODS FOR DETECTING RESCUE HOIST LOADS

FIELD

The disclosure relates generally to cable hoists, and more particularly to rescue hoist load sensing systems and methods.

BACKGROUND

During the course of rescue operations using an aircraft rescue hoist, the supported load on the rescue hoist cable is imparted to the aircraft via the rescue hoist and supporting structure. Often times, the support load will be one or two personnel. The hoists have safe operating capacities, and exceeding the safe capacity may result in dangerous conditions. For example, a helicopter may have a maximum load capacity that includes any weight hoisted on a hook. As a result, operating within capacity limits is important for the safety of the aircraft, crew, and passengers. However, today, load measurements on the hoist are typically estimated by operators.

SUMMARY

A boom assembly for a hoist is provided. The boom assembly may include a flat surface configured to elastically deform in response to a load on the hoist, and a strain sensor coupled to the flat surface and configured to generate an electronic signal.

In various embodiments, a first electronic component may be mechanically coupled to the boom assembly and configured to process the electronic signal. The first electronic component may include a transient suppressor, an amplifier, a low-pass filter, a scaling network, and/or an input/output connector. A second electronic component may be mechanically coupled to the boom assembly and configured to provide a power signal. The second electronic component may include the transient suppressor, an electromagnetic interference (EMI) filter, a DC to DC converter, a DC bus, and/or a precision reference component. The boom assembly may also include an end cap with the first electronic component and the second electronic component mechanically coupled to the end cap. A base portion may be mechanically coupled to the end cap with the flat surface being a surface of the base portion. An arm may also extend from the base portion and have a hoist interface configured to retain a hoist assembly.

A hoist load sensor system is also provided. The hoist load sensor system may include a strain load sensor mechanically coupled to a boom assembly. An amplifier may be mechanically coupled to the boom assembly and electronically coupled to the strain load sensor. The amplifier may amplify a signal generated by the strain load sensor. A low-pass filter may be electronically coupled to the boom assembly and electronically coupled to the amplifier. The low-pass filter may filter an amplified signal from the amplifier. An input/output connector may be electronically coupled to the low-pass filter. The input/output connector may output a filtered signal from the low-pass filter.

In various embodiments, an electromagnetic interference (EMI) filter may be configured to filter a power signal from the input/output connector. A precision reference component may generate a reference signal for use by the strain load sensor. The strain load sensor may be mounted on a flat surface of the boom assembly. A base portion of the boom assembly may include the flat surface. An end cap may include the amplifier, the low-pass filter, and/or the input/output connector disposed on the end cap. The end cap may further include a plug having a wire configured to carry the signal generated by the strain load sensor. The plug may be electronically connected to the amplifier.

A boom assembly for a hoist is also provided. The boom assembly may include a base portion configured to mounting to an airframe, a flat surface formed on the base portion and configured to elastically deform in response to a load on the hoist, and a strain sensor coupled to the flat surface. The strain sensor may generate a signal in response to elastic deformation of the flat surface. An arm may extend from the base portion and include a hoist interface.

In various embodiments, a first electronic component may be mechanically coupled to the boom assembly and configured to process the signal. The first electronic component may include a transient suppressor, an amplifier, a low-pass filter, a scaling network, and/or an input/output connector. A second electronic component may be mechanically coupled to the boom assembly and configured to provide a power signal. The second electronic component may include the transient suppressor, an electromagnetic interference (EMI) filter, a DC to DC converter, a DC bus, and/or a precision reference component. The first electronic component and the second electronic component may be mechanically coupled to the end cap.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Hoist load sensors and systems of the present disclosure may accurately measure the load imparted into the airframe of an aircraft through a hoist. A strain sensor measures strain in the load path of the hoist. The signal from the strain gauge may then be processed and converted to a load measurement. The load sensing systems enable an aircrew to accurately assess the mass of the on-hoist load.

Figure 1:
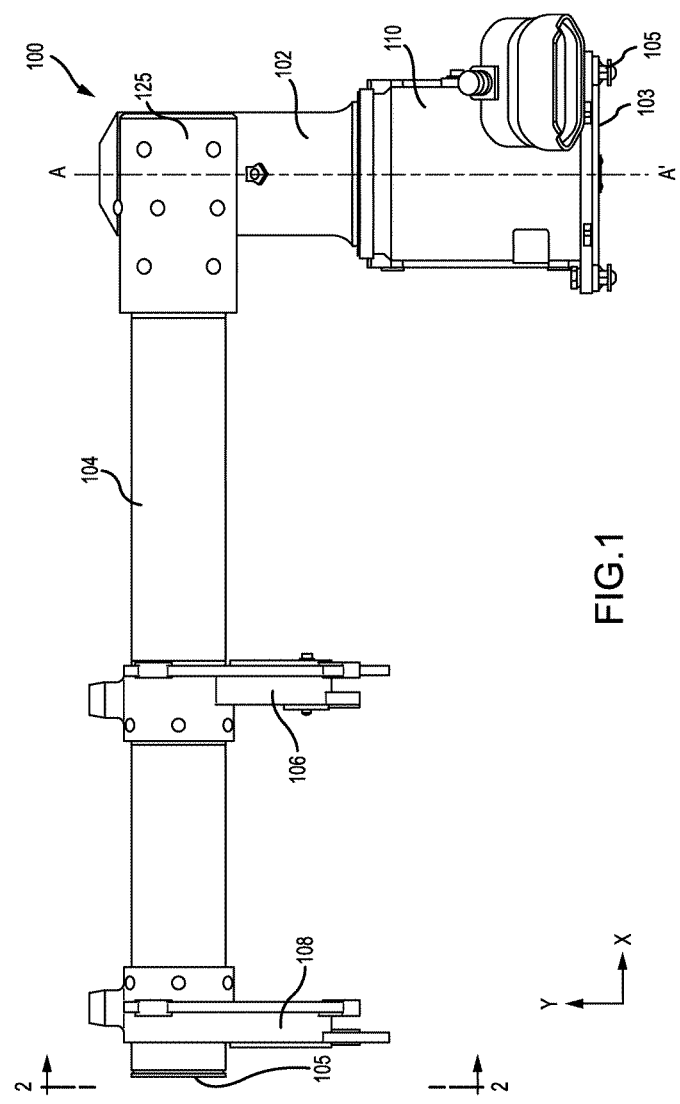
FIG. 1 illustrates a boom assembly having a hoist load measurement system, in accordance with various embodiments.

With reference to FIG. 1, an exemplary boom assembly 100 is shown, in accordance with various embodiments. Boom assembly 100 may include a base portion 102 configured for mounting to a support structure such as, for example, an airframe at surface 103. Base portion 102 may be fixed to the support structure by fasteners 107 such as bolts, rivets, or other suitable fasteners. Base portion 102 may be rotatable about axis A-A' to position arm 104 relative to the support structure. For example, base portion 102 may rotate to translate arm 104 into a deployed position (i.e., protruding from the airframe) and/or into a stowed position (i.e., retracted near or into the airframe). Base portion 102 may generally extend from the support structure in the x-direction.

In various embodiments, arm 104 may extend from base portion 102 in the y-direction. Arm 104 may terminate at end 105 with distal hoist interface 108 and proximal hoist interface 106 configured to retain a hoist assembly. In that regard, the load path from a hoist assembly (e.g., a hook, cable, and drum among other components) may enter the boom assembly through distal hoist interface 108 and proximal hoist interface 106. The load path may continue through arm 104 and into base portion 102. From base portion 102, the load path disperses into the airframe.

Figure 2:
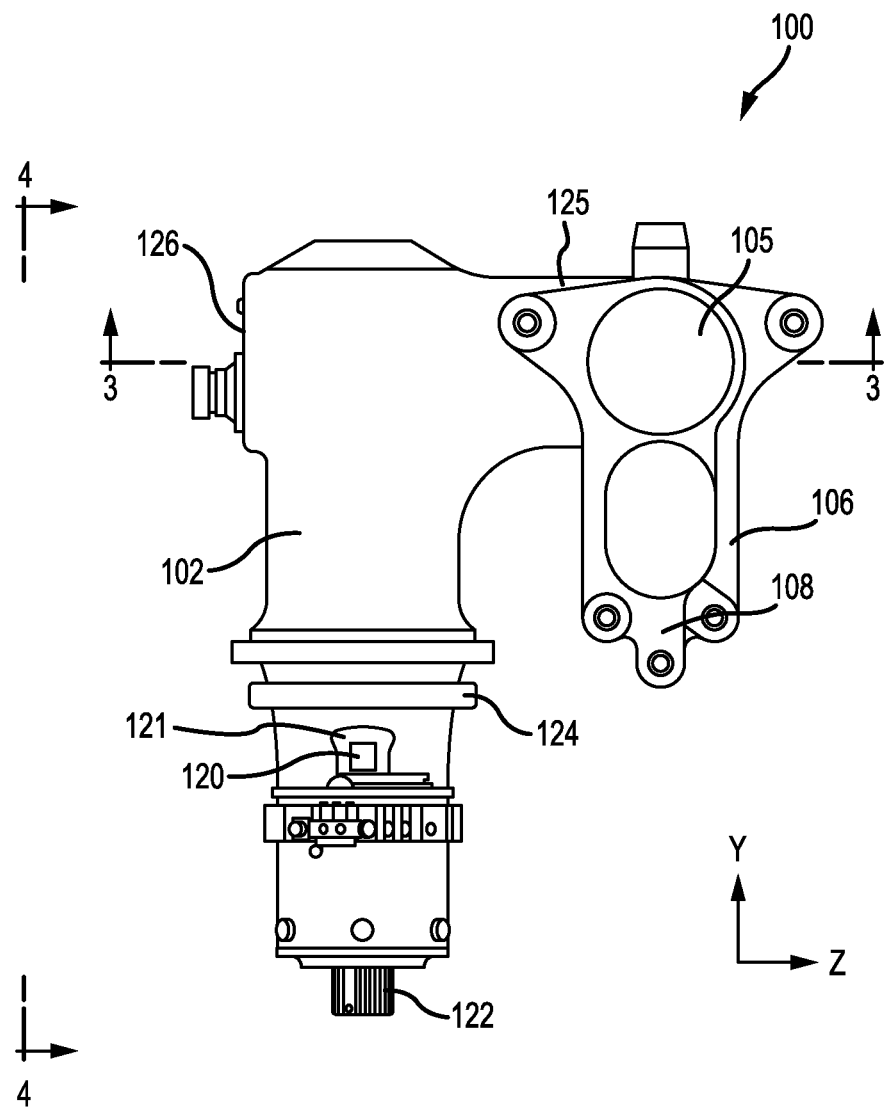
FIG. 2 illustrates an elevation view of a boom assembly having a strain gauge for detecting load on the hoist, in accordance with various embodiments.

With reference to FIG. 2, a boom assembly 100 is shown from the vantage point 2 of FIG. 1, with base housing 110 removed, in accordance with various embodiments. Boom assembly 100 includes rotary interface 122 coupled to base portion 102. Housing support 124 on base portion 102 is configured to support base housing 110 of FIG. 1. A strain sensor 120 is coupled to flat surface 121 of boom assembly 100. Strain sensor 120 may be disposed on flat surface 121 anywhere on boom assembly 100. The strain sensor location may be positioned so as to tend to reduce strain imparted by rotational or twisting moment caused by the offset location of the attached rescue hoists. Thus, the strain sensor location may be in line with the greatest imparted strain in response to a load being applied to the hoist. However, in various embodiments, strain sensor 120 is coupled to a lower portion of base portion 102 and protected by base housing 110 of FIG. 1. Flat surface 121 may be formed on boom assembly 100 by, for example, milling, turning, or other machining techniques. Strain sensor 120 may be disposed in the load path of boom assembly 100 to accurately measure the load imparted to an airframe. Flat surface 121 may be precisely formed to create a surface that elastically deforms under load on boom assembly 100 and returns to the initial flat shape absent the load. Strain sensor 120 may produce an output voltage with a predetermined relationship to the load on boom assembly 100 and flat surface 121.

In various embodiments, end cap 126 may be coupled to base portion 102 of boom assembly 100. End cap 126 may contain signal processing electronics that are electrically coupled to strain sensor 120, as explained in greater detail below. Although end cap 126 is depicted as located in base portion 102 opposite support portion 125 in the z-direction, other locations may be suitable for signal processing electronics.

In various embodiments, base portion 102 may extend in the z-direction into support portion 125 for arm 104 of FIG. 1. Arm 104 may extend from support portion 125 and terminate and end 105. Distal hoist interface 108 and proximal hoist interface 106 may thus be disposed along arm 104 between end 105 and support portion 125 of boom assembly 100.

Figure 3:
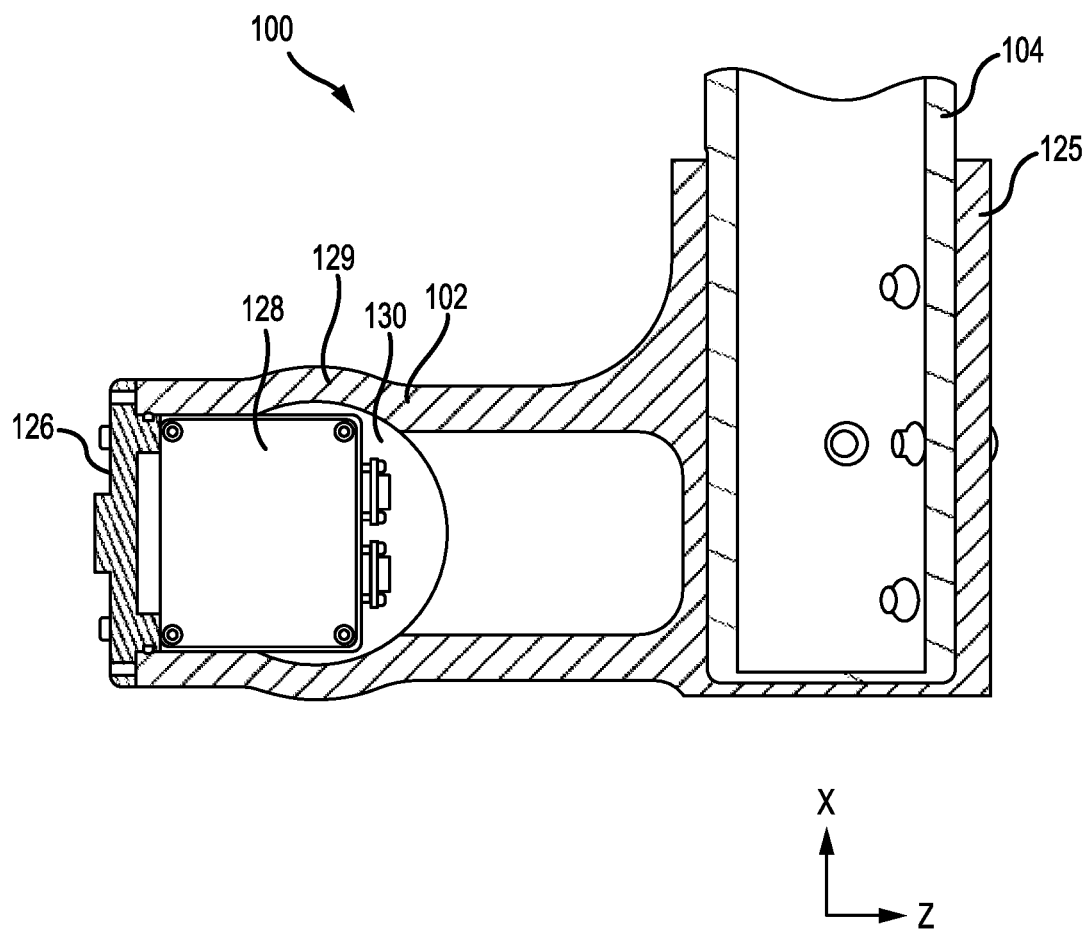
FIG. 3 illustrates a cross sectional view of a boom assembly having an end cap, in accordance with various embodiments.

Referring now to FIG. 3, a cross sectional view of boom assembly 100 taken from plane 3 of FIG. 2 is shown, in accordance with various embodiments. Boom assembly 100 may be formed from with tubular sections defining cavities. Base portion 102 includes walls 129 that define cavity 130. Cavity 130 may be partially opened in the z-direction towards end cap 126. End cap 126 may be oriented with internal components 128 disposed within cavity 130. End cap 126 may be removably fixed to base portion 102 so that internal components 128 are retained in cavity. Support portion 125 may extend from base portion in the z-direction and include a tubular interface extending in the x direction to interface with arm 104. For example, support portion 125 may comprise a tubular section having a larger diameter than arm 104 so that arm 104 may slide into support portion 125.

Figure 4:
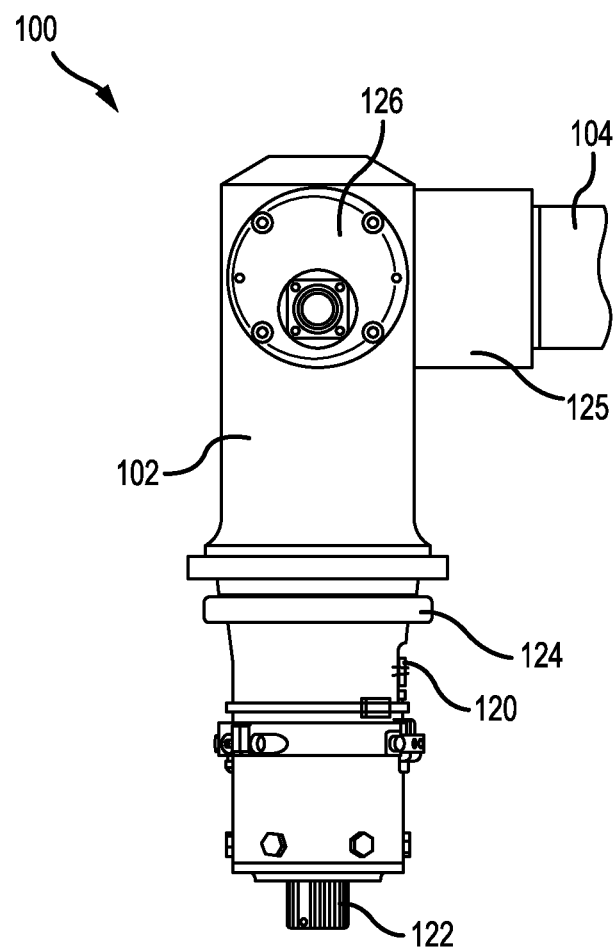
FIG. 4 illustrates a boom assembly with an end cap installed and a strain gauge electrically coupled to the end cap, in accordance with various embodiments.

Referring now to FIG. 4, a boom assembly 100 is shown as viewed from vantage point 4 of FIG. 2, in accordance with various embodiments. Rotary interface 122 extends from base portion 102. Housing support 124 on base portion 102 is configured to support base housing 110 of FIG. 1. Strain sensor 120 is located on a flat segment of housing assembly and configured to measure strain in the load path. End cap 126 is installed in base portion 102 and arm 104 extends away from base portion 102.

Figure 5:
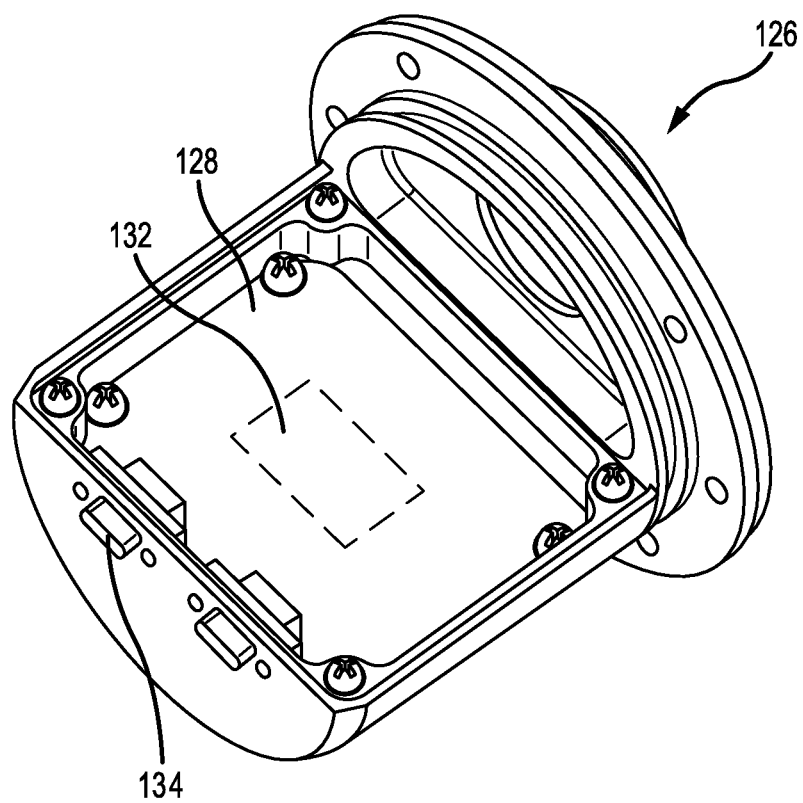
FIG. 5 illustrates a perspective view of an end cap configured to process signals from a strain gauge, in accordance with various embodiments.

With reference to FIG. 5, end cap 126 is shown, in accordance with various embodiments. End cap 126 contains internal components 128. Internal components 128 may include circuitry 132 for processing signals from strain sensor 120 of FIG. 2. Circuitry 132 may communicate with strain sensor 120 through plugs 134. Plugs 134 may be an electronic interface having one or more wire to carry a strain signal.

Figure 6:
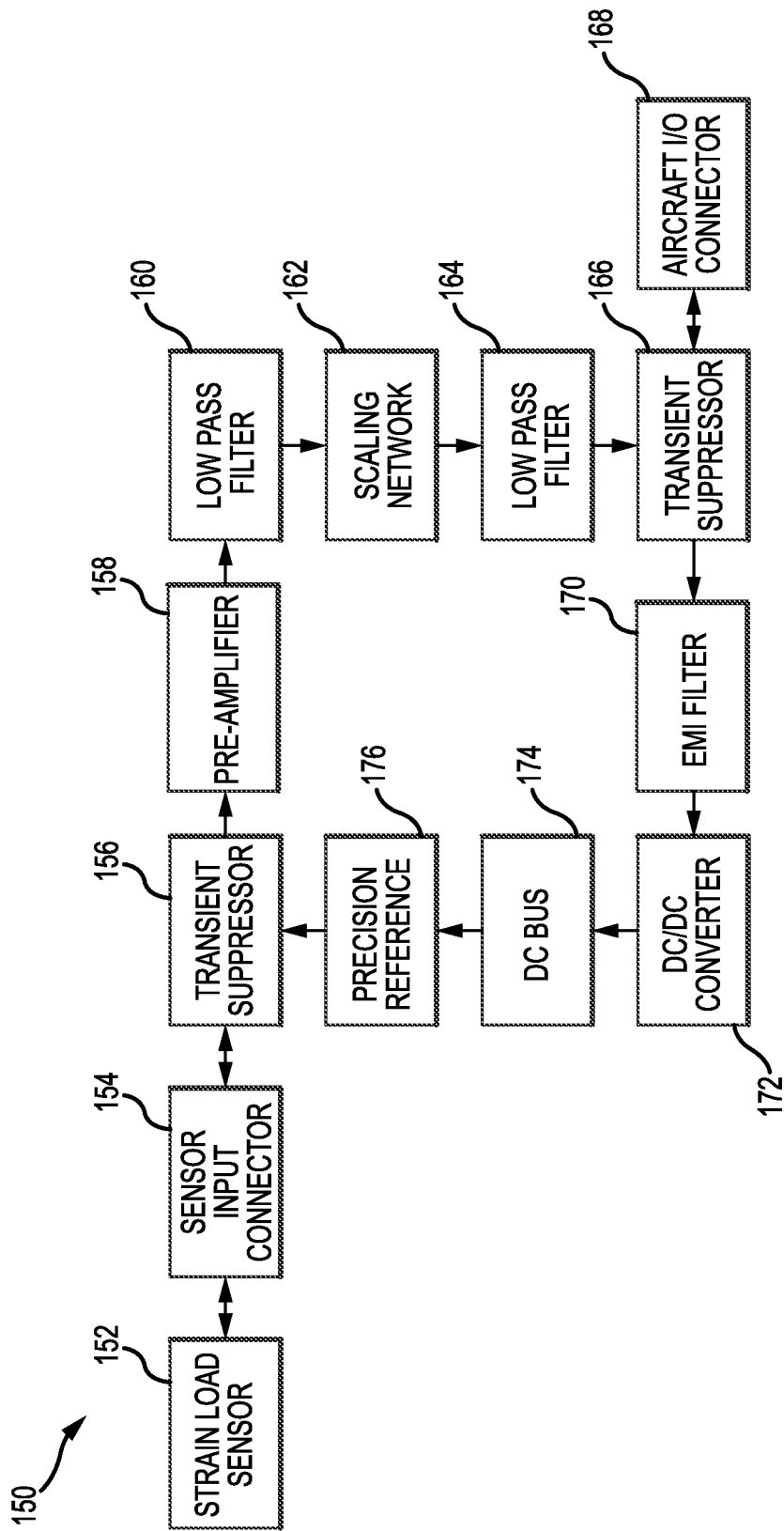
FIG. 6 illustrates a schematic diagram of an electronic system configured to process signals from a strain gauge.

Referring now to FIGS. 5 and 6, circuitry 132 may include one or more electronic components 150 to process and transmit the signal from strain load sensor 152 (i.e., strain sensor 120 of FIG. 2) for further use.

The signal from strain load sensor may include noise artifacts from various conditions around the sensor, and the signal may also vary in strength and characteristics in various embodiments. For example, the vibration of a helicopter in flight may manifest in the signal as the vibrations are transferred into boom assembly 100. Strain load sensor 152 may be in electronic communication with sensor input connector 154. Sensor input connector 154 may be, for example, plugs 134 of FIG. 5. The signal from strain load sensor 152 may be passed from sensor input connector 154 into transient suppressor 156. Transient suppressor 156 may be, for example, a transient voltage suppressor to protect electronic components 150 from momentary voltage surges, for example. The signal may then be passed from transient suppressor 156 a pre-amplifier 158 to apply a gain and amplify the signal. The gain value may vary in various embodiments. For example, the pre-amplifier 158 may apply a voltage gain value from 200-600, from 300 to 500, or about 400. The amplified signal may then be filtered in low-pass filter 160. The target frequencies of low-pass filter 160 may vary in various embodiments. For example, the low-pass filter may be tuned to −6 dB of the target frequencies.

In various embodiments, the signal from low-pass filter 160 may be an input into scaling network 162. The scaled signal from scaling network may be input to a secondary low-pass filter 164. Secondary low-pass filter 164 may be tuned to various frequencies in various embodiments. For example, secondary low-pass filter 164 may be tuned to −12 dB. The filtered output signal of secondary low-pass filter 164 may be passed to a secondary transient suppressor 166. The output from secondary transient suppressor 166 may be sent to an aircraft input/output connector for use by various systems in the aircraft such as, for example, a gauge or monitoring device that reports the load on boom assembly 100 (e.g., as measured in pounds, kilograms, or another readable format for an aircrew).

In various embodiments, secondary transient suppressor 166 may receive a power signal from the aircraft input/output connector 168 for use in signal amplification in pre-amplifier 158 and providing a reference power source for strain load sensor 152. For example, aircraft input/output connector 168 may provide 28 volt power from an electronic system of an aircraft. Secondary transient suppressor 166 may send a signal through electromagnetic interference (EMI) filter 170. EMI filter 170 may provide an input signal to a DC to DC converter 172, which in turn powers DC Bus 174. DC bus 174 may provide a power source for the various electronic devices of boom assembly 100. For example, a precision reference component 176 may produce a precision reference voltage for use in strain load sensor 152. The precision reference voltage may be passed through the sensor input connector 154 and into strain load sensor 152 for further use. Power from the DC bus 174 may also be used as a power source for pre-amplifier 158. The electronic components 150 may act as an amplifier for the strain sensor signal having an input of +/−25 mV, an output of +/−10V, and a cutoff frequency of −5 Hz, for example.

Figure 7:
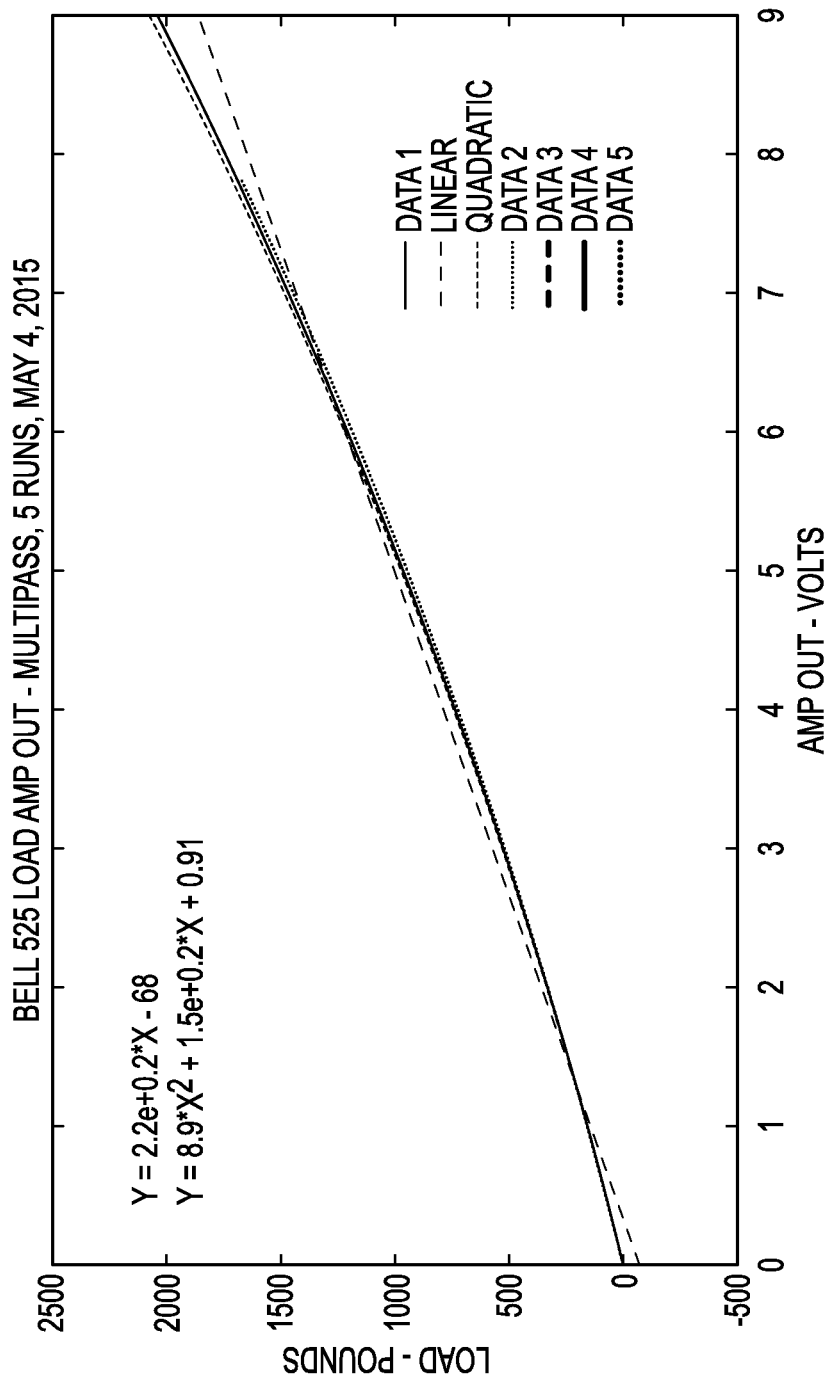
FIG. 7 illustrates exemplary output results from a processed signal from a strain gauge, in accordance with various embodiments.

Referring briefly to FIG. 7, a graph of load (in pounds) against voltage out is shown, in accordance with various embodiments. Data 1, Data 2, Data 3, Data 4, and Data 5 are each measured results from test runs loading boom assembly 100 with the load (represented on the y-axis) and the corresponding amplifier output voltage (represented on the x-axis). A linear line was fit to the data sets and is depicted to illustrate the load corresponding to a measured voltage may be loosely (relative to the quadratic function) modeled by a linear function. A quadratic function is also fit to the data sets and is depicted to illustrate the load corresponding to a measured voltage may be tightly (relative to the linear function) modeled by a quadratic function. The linear function used in the chart is $Y=2.2e+0.2X-68$, where X is the amplifier output as measured in volts and e is the irrational number known as Euler's number. The quadratic function used in the chart is $Y=8.9X^2+1.5e+0.2X+0.91$, where X is the amplifier output as measured in volts and e is the irrational number known as Euler's number. The values of each factor in the quadratic and/or linear functions may be modified to suit the various boom assemblies 100 that may be used in various embodiments.

The load measurement systems and methods disclosed herein may make accurate electronic measurements of the load on boom assembly 100. The load measurements may then be used to assess the total load on an aircraft, for example. The electronic components integrated into boom assembly 100 allow for strain measurement to generate an electronic strain signal and processing to convert the raw strain signal into a useable output signal representative of load on boom assembly 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A boom assembly for a hoist, comprising:
   a flat surface configured to elastically deform in response to a load on the hoist;
   a strain sensor coupled to the flat surface and configured to generate an electronic signal;
   a first electronic component mechanically coupled to the boom assembly and configured to process the electronic signal, wherein the first electronic component includes at least one of a transient suppressor, an amplifier, a low-pass filter, a scaling network, or an input/output connector;
   a second electronic component mechanically coupled to the boom assembly and configured to provide a power signal, wherein the second electronic component includes at least one of the transient suppressor, an electromagnetic interference (EMI) filter, a DC to DC converter, a DC bus, or a precision reference component; and
   an end cap, wherein the first electronic component and the second electronic component are mechanically coupled to the end cap.

2. The boom assembly of claim 1, further comprising:
   a base portion mechanically coupled to the end cap, wherein the flat surface is a surface of the base portion; and
   an arm extending from the base portion and including a hoist interface configured to retain a hoist assembly.

3. A hoist load sensor system, comprising:
   a strain load sensor mechanically coupled to a boom assembly;
   an amplifier mechanically coupled to the boom assembly and electronically coupled to the strain load sensor, wherein the amplifier is configured to amplify a signal generated by the strain load sensor;
   a low-pass filter electronically coupled to the boom assembly and electronically coupled to the amplifier, wherein the low-pass filter is configured to filter an amplified signal from the amplifier; and
   an input/output connector electronically coupled to the low-pass filter, wherein the input/output connector is configured to output a filtered signal from the low-pass filter;
   an electromagnetic interference (EMI) filter, wherein the EMI filter is configured to filter a power signal from the input/output connector;
   a precision reference component, wherein the precision reference component is configured to generate a reference signal for use by the strain load sensor.

4. The hoist load sensor system of claim 3, wherein the strain load sensor is mounted on a flat surface of the boom assembly.

5. The hoist load sensor system of claim 4, further comprising a base portion of the boom assembly comprising the flat surface.

6. The hoist load sensor system of claim 5, further comprising an end cap, wherein at least one of the amplifier, the low-pass filter, or the input/output connector is disposed on the end cap.

7. The hoist load sensor system of claim 6, wherein the end cap further comprise a plug having a wire configured to carry the signal generated by the strain load sensor, wherein the plug is electronically connected to the amplifier.

8. A boom assembly for a hoist, comprising:
   a base portion configured to mounting to an airframe;
   a flat surface formed on the base portion and configured to elastically deform in response to a load on the hoist;
   a strain sensor coupled to the flat surface and configured to generate a signal in response to elastic deformation of the flat surface;
   an arm extending from the base portion and including a hoist interface;
   a first electronic component mechanically coupled to the boom assembly and configured to process the signal, wherein the first electronic component includes at least one of a transient suppressor, an amplifier, a low-pass filter, a scaling network, or an input/output connector;
   a second electronic component mechanically coupled to the boom assembly and configured to provide a power signal, wherein the second electronic component includes at least one of the transient suppressor, an electromagnetic interference (EMI) filter, a DC to DC converter, a DC bus, or a precision reference component; and
   an end cap, wherein the first electronic component and the second electronic component are mechanically coupled to the end cap.

* * * * *